United States Patent [19]
Kanda

[11] Patent Number: 4,831,613
[45] Date of Patent: May 16, 1989

[54] METHOD AND APPARATUS FOR REPRODUCING RECORDED INFORMATION BY PROCESSING PLURAL READ-OUT SIGNALS OBTAINED FROM PLURAL SOURCES ACTING ON AN INFORMATION CARRYING MEMBER

[75] Inventor: Shigeto Kanda, Tokyo, Japan

[73] Assignee: Canon Kabushiki Kaisha, Tokyo, Japan

[21] Appl. No.: 165,385

[22] Filed: Feb. 29, 1988

Related U.S. Application Data

[63] Continuation of Ser. No. 574,126, Jan. 26, 1984, abandoned.

[30] Foreign Application Priority Data

Jan. 28, 1983 [JP] Japan ................................. 58-11468

[51] Int. Cl.⁴ ............................................. G11B 7/08
[52] U.S. Cl. ..................................... 369/109; 369/106; 369/124
[58] Field of Search ..................................... 369/44–46, 369/54, 58, 100, 106, 107, 109, 111, 124, 174, 175; 250/201 DF

[56] References Cited

U.S. PATENT DOCUMENTS

| 3,985,952 | 10/1976 | Adler | 369/111 X |
| 4,037,252 | 7/1977 | Janssen | 369/111 X |
| 4,283,777 | 8/1981 | Curry et al. | 369/44 X |
| 4,305,144 | 12/1981 | Okada | 369/46 |
| 4,340,950 | 7/1982 | Kosaka | 369/44 |
| 4,462,095 | 7/1984 | Chen | 369/44 |
| 4,512,002 | 4/1985 | Kosaka et al. | 369/44 |
| 4,539,665 | 9/1985 | Iso et al. | 369/32 X |
| 4,635,243 | 1/1987 | Takeoka | 369/44 |

Primary Examiner—Alan Faber
Assistant Examiner—W. R. Young
Attorney, Agent, or Firm—Fitzpatrick, Cella, Harper & Scinto

[57] ABSTRACT

Disclosed are optical information reproducing method and apparatus wherein an information carrying member having an information pattern recorded thereon is irradiated by plural light beams which are spaced from each other in the direction of tracing of the information pattern, the light beams modulated by the information pattern are simultaneously and independently photoelectrically converted, and a predetermined operation is effected relative to the outputs obtained by the photoelectric conversion to thereby generate a reproduction signal with respect to the recorded information.

7 Claims, 4 Drawing Sheets

METHOD AND APPARATUS FOR REPRODUCING RECORDED INFORMATION BY PROCESSING PLURAL READ-OUT SIGNALS OBTAINED FROM PLURAL SOURCES ACTING ON AN INFORMATION CARRYING MEMBER

This application is a continuation of application Ser. No. 574,126 filed Jan. 26, 1984, now abandoned.

BACKGROUND OF THE INVENTION

1. Field of the Invention

This invention relates to a method of and an apparatus for reproducing information by irradiating an information carrying member with light and by detecting the light modulated by the information recorded on the information carrying member.

2. Description of the Prior Art

In general, an optical information reproducing apparatus includes a light source such as a laser or the like, optical systems such as a collimator lens, objective lens or the like, and a light receiving element such as a pinphotodiode or the like. In the reproducing apparatus as such, the light beam emerging from the light source is converged on an information carrying member so that the light is optically modulated in accordance with the information recorded on the information carrying member, whereafter the modulated light beam is photoelectrically converted by the light receiving element, thus converting the recorded information into electrical signals. Such optical information reproducing apparatus is applicable to an optical video disc, optical digital audio disc, optical information file or the like. Usually, the recorded information comprises fine patterns formed concentrically or spirally on a rotatable disk-like information carrying member (disc). These fine patterns are defined by surface unevenness, partially formed holes, variation in the reflection factor, variation in the direction of magnetization or the like. In any application of the reproducing apparatus, the patterns must be minute in order to improve the recording density. For modulating the light beam with such minute patterns, the minimum spot diameter of the beam converging on the information carrying member is determined by the numerical aperture (NA) of the lens used in the optical head, the wavelength of the light to be used and the like, and has a finite value.

Figure 1:
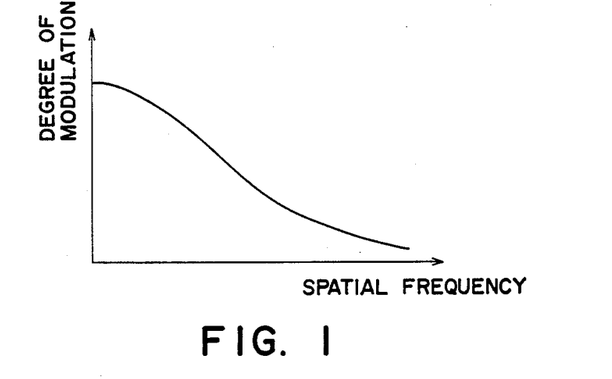
FIG. 1 illustrates the spatial frequency transmitting characteristic in a conventional optical information reproducing apparatus.

On the other hand, it is considered that the converged beam spot has, in its cross-section orthogonal to the optical axis, a light distribution which is usually similar to the Gaussian distribution. And in the modulation of such light beam by the fine patterns, the degree of modulation by those by fine patterns as having high spatial frequencies is lowered owing to the modulation transfer function (MTF) so that the noise margin of the overall system is diminished, as will be seen from FIG. 1 of the accompanying drawings which shows the spatial frequency transmitting characteristic in a case of using a single beam spot.

Where the converged beam traces the minute pattern array on the recording disc at a constant linear speed, the amplitude of the reproduction signal depends on the frequency of the reproduction signal (i.e., a higher frequency leads to a smaller amplitude). On the other hand, in a case of tracing with a constant angular speed, the aforesaid frequency-amplitude characteristic changes with the variation in the linear speed depending on the tracing position of the converged beam spot.

As the techniques for supressing the effects of the modulation transfer function in such type of optical head, there are known:

① line equalizing method by a high-pass filter using a LCR filter and an active filter, and by a band-pass filter; and ② line equalizing method by a transversal filter using a delay element.

By the modulation transfer function of a lens system, only the frequency-amplitude characteristic of the signal is affected while the frequencyphase characteristic is not affected. However, according to the above-noted method ①, it is difficult to change only the frequency-amplitude characteristic without changing the frequency-phase characteristic. Therefore, even if the diminution of the amplitude in the great range owing to the MTF can be cancelled, there would still occur phase distortion.

Further, the above-noted methods ① and ② are both the signal processing methods with respect to the time region (i.e., they are not signal processing methods with respect to the spatial region). Accordingly, while they are applicable to such a system in which "time" and "space" correspond to each other, e.g. such a system in which the recording disc is rotated so as to maintain a constant tracing speed of the recording pattern to reproduce the information signal, they are not applicable to such a system in which the recording disc is rotated at a constant angular speed since in this case the frequency characteristic of the filter means must be changed in accordance with the tracing position of the converged beam spot. Furthermore, the above-noted method ⧽② is not advantageous in that it requires a delay element which leads to increase in the cost.

SUMMARY OF THE INVENTION

An object of the present invention is to provide optical information reproducing method and apparatus which are free from any phase distortion and which improve the frequency-amplitude characteristic of the reproduction signal.

Another object of the present invention is to provide an optical information reproducing method and apparatus which permit generation of reproduction signals of satisfactory frequency-amplitude characteristic and which are applicable even to such a case where the converged beams do not trace the minute patterns on the information carrying member at a constant linear speed.

The above objects are achieved by the present invention wherein an information carrying member having an information pattern recorded thereon is irradiated by plural light beams which are spaced from each other in the direction of tracing of the information pattern, the light beams modulated by the information pattern are simultaneously and independently photoelectrically converted, and a predetermined operation is effected relative to the outputs obtained by the photoelectric conversion to thereby generate a reproduction signal with respect to the recorded information.

Other objects and features of the present invention will be apparent from the following description taken in conjunction with the accompanying drawings.

DESCRIPTION OF THE PREFERRED EMBODIMENTS

The optical information reproducing method and apparatus according to the present invention will now be described with reference to FIGS. 2–7.

Figure 2:
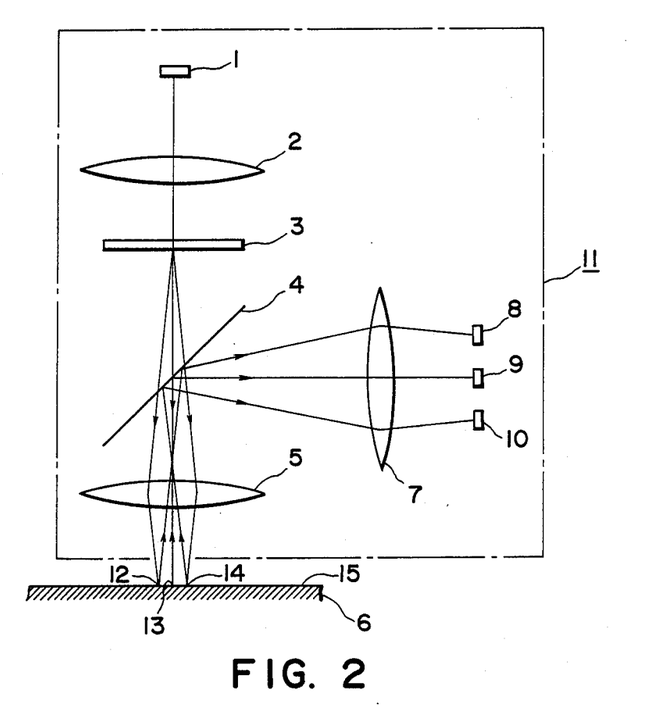
FIG. 2 is a schematic view showing an arrangement of an optical system of an optical information reproducing apparatus in accordance with the present invention.

FIG. 2 is a schematic view of the arrangement of the optical system of an optical information reproducing apparatus according to the present invention. Denoted generally by numeral 11 is an optical head. The light beam emerging from a light source 1 such as a semiconductor laser is collimated by a collimator lens 2 and then is diffracted by a diffraction grating 3 so that the light beam is divided into plural light beams. When, among these plural light beams, only the 0th-order and the 1st-order diffraction light are considered, these three light beams after passing through a half-mirror 4 are converged by an objective lens 5 to produce beam spots 12, 13 and 14 impinging on a disc 6 which is an information carrying member. The impinging light beams are reflected by the disc 6 while being optically modulated by minute patterns 15 formed on the disc 6. The reflected light beams are refracted by the objective lens 5 and further reflected by the half-mirror 4 toward a condensing lens 7. By this condensing lens 7, the light beams are condensed on photoelectric converters 8, 9 and 10 such as pin-photodiodes, whereat they are photoelectrically converted, respectively. More specifically, the reflected light beam of the beam spot 12 is received by the photoelectric converter 8, the reflected light beam of the beam spot 13 is received by the photoelectric converter 9, and the reflected light beam of the beam spot 14 is received by the photoelectric converter 10.

Figure 3:
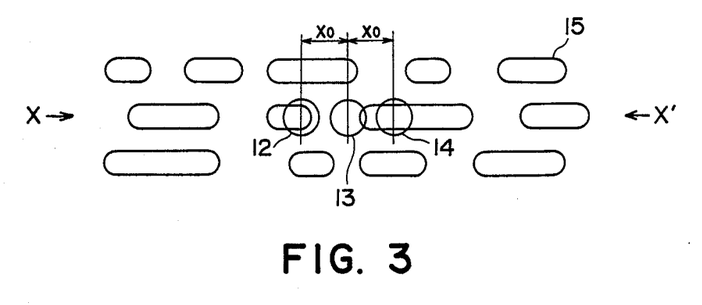
FIG. 3 is a plan view showing the positional relation between the beam spots and the minute patterns on the information carrying member in the apparatus shown in FIG. 2.

As shown in FIG. 3, the beam spots 12, 13 and 14 are arranged into an array extending in the direction of array or row of the minute patterns 15 and these beam spots are spaced from each other through a distance $x_0$. The minute patterns are moved in the X-direction with the rotation of the disc.

Figure 4:
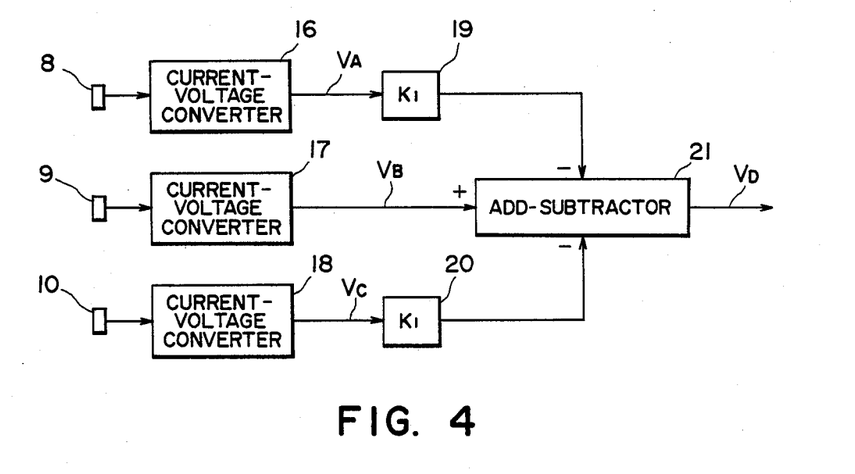
FIG. 4 is a block diagram showing the structure of the signal operating unit of the apparatus shown in FIG. 2.

The photo-electric currents which are the outputs of the photoelectric converters 8, 9 and 10 are converted into photo-electric voltages $V_A$, $V_B$ and $V_C$ by current-to-voltage converters 16, 17 and 18, respectively, such as shown in FIG. 4. The voltages $V_A$ and $V_C$ are multiplied by $K_1$, respectively, by attenuators 19 and 20.

Then, at an add-subtractor 21, the following operation is effected:

$$V_D = V_B - K_1(V_A + V_C)$$

For the purpose of simplification of the description, the light beams and the disc 6 are cut along a plane (the X—X' plane in FIG. 3) orthogonal to the optical axis in order to allow consideration of one-dimensional light distribution, and the invention will be described while regarding the minute patterns 15 as being one-dimensional grating distribution of intensity of light. Thus, the following description when it is extended to two-dimensional light distribution, would retain its universality even if the minute patterns are defined by an amplitude grating (grating structure which changes the amplitude of the reflected light) or a phase grating (grating structure which changes the phase of the reflected light).

Figure 5:
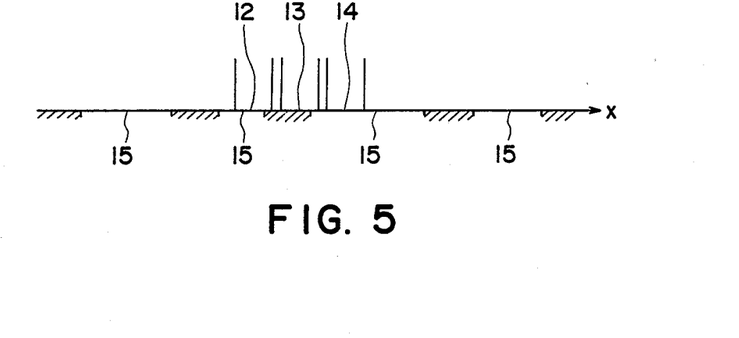
FIG. 5 is a sectional view showing the positional relation between the beam spots and the minute patterns in the apparatus shown in FIG. 2.
Figure 6:
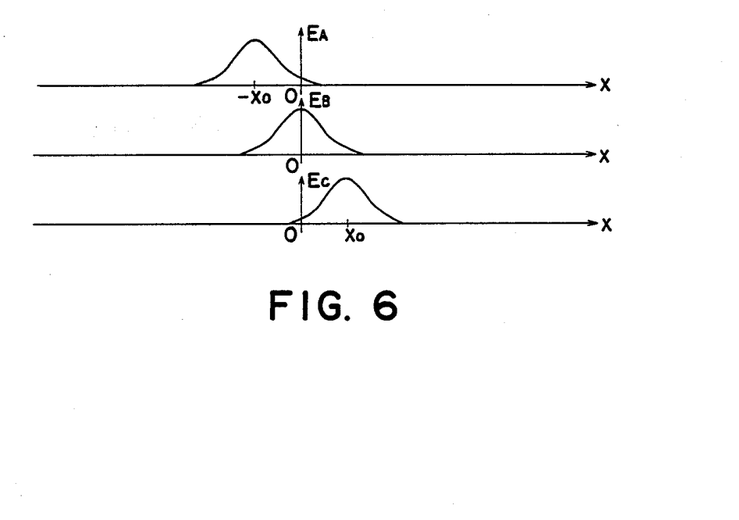
FIG. 6 shows the light intensity distributions of the beam spots in the apparatus shown in FIG. 2.

FIG. 5 shows the relation between the light beam spots 12, 13 and 14 and the minute patterns 15 when the sheet of FIG. 3 is cut along the X—X' plane. Assuming now that the array of the minute patterns 15 is in the direction of x-axis, the light intensity distribution of each of the light beam spots is usually of Gaussian configuration such as shown in FIG. 6. In this figure, the light intensity distribution of the beam spot 12 is denoted by $E_A$, the light intensity distribution of the beam spot 13 is denoted by $E_B$, and the light intensity distribution of the beam spot 14 is denoted by $E_C$. If these light intensity distributions $E_A$, $E_B$ and $E_C$ of the same Gaussian configuration have the same peak level $E_p$, the values can be represented by the following equations:

$$E_A(x) = E_p \exp\{-2(x+x_0)^2/w_0^2\} \qquad (1)$$

$$E_B(x) = E_p \exp\{-2x^2/w_0^2\} \qquad (2)$$

$$E_C(x) = E_p \exp\{-2(x-x_0)^2/w_0^2\} \qquad (3)$$

wherein $w_0$ is the beam spot diameter.

It is assumed now that the light intensity grating distribution according to the minute patterns 15 is sinusoidal as can be represented by the following equation:

$$F(X) = F_0 + F_{s1} \sin w_1 x \quad (F_0 > F_{s1}) \qquad (4)$$

where $w_1$ is the spatial frequency, $F_0$ is the direct-current component and "$F_{s1} \sin w_1 x$" is the information component.

Rotating the disc 6 is equivalent to moving the aforesaid light intensity distributions $E_A$, $E_B$ and $E_C$ in the same direction while maintaining the distance $x_0$ between the peak values. If the amount of movement is $y$, the light quantities $G_A$, $G_B$ and $G_C$ to be received by the photoelectric converters 8, 9 and 10 become functions of the amount of movement $y$ (convolution of the light intensity distributions $E_A$, $E_B$ and $E_C$ and the intensity grating distribution $F$) and are represented by the following equations:

$$G_A(y) = \int_{-\infty}^{\infty} \exp(-2x^2/w_0^2)[F_0 + F_{s1}\sin w_1\{x-(y-x_0)\}]dx \qquad (5)$$

$$G_B(y) = \int_{-\infty}^{\infty} \exp(-2x^2/w_0^2) \{F_0 + F_{s1}\sin w_1(x-y)\}dx \quad (6)$$

$$G_C(y) = \int_{-\infty}^{\infty} \exp(-2x^2/w_0^2) [F_0 + F_{s1}\sin w_1 \{x-(y-x_0)\}]dx \quad (7)$$

If the photoelectric conversion coefficient of each of the photoelectric converters 8, 9 and 10 is $K_2$ and the conversion coefficient of the current-to-voltage converter is $K_3$, the information component $V_{DS}$ of the output $V_D$ from the add-subtractor 21 can be given by the following equation:

$$\begin{aligned} V_{DS}(y) &= K_2 K_3 F_{s1}(1 - 2K_1\cos w_1 x_0) \\ & \quad F[\exp(-2y^2/w_0^2) * \sin w_1 y] \\ &= K_2 K_3 F_{s1}(1 - 2K_1\cos w_1 x_0) \cdot \\ & \quad F[\exp(-2y^2/w_0^2)] \cdot F[\sin w_1 y] \end{aligned} \quad (8)$$

wherein "F[]" represents the Fourier conversion and "*" represents the convolution integration.

Next, where the light intensity grating distribution according to the minute patterns 15 is cosinusoidal as can be defined by the following equation:

$$F(x) = F_0 + F_{c1}\cos w_1 x \, (F_0 > F_{c1}) \quad (9)$$

then the information component $V_{DS}$ of the output $V_D$ from the adder 21 can be represented by the following equation:

$$V_{DS}(y) = K_2 K_3 F_{c1}(1 - 2K_1\cos w_1 x_0) \cdot F[\exp(-2y^2/w_0^2)] \cdot F[\cos w_1 y] \quad (10)$$

If, therefore, the minute patterns 15 have plural spatial frequency components and can be represented by the following equation:

$$F(x) = F_p + \sum_{n=1} F_{sn}\sin W_n + \sum_{m=1} F_{cm}\cos W_m x \quad (11)$$

then it follows $$V_{DS}(y) = K_2 K_3 \left[ (1 - 2K_1) F_p + F[\exp(-2y^2/w_0^2)] \cdot \right. \\ \left. \left\{ \sum_{n=1}(1 - 2K_1\cos w_n x_0) \cdot F[\sin w_n y] + \right. \right. \\ \left. \left. \sum_{m=1}(1 - 2K_1\cos w_m x_0) \cdot F[\cos w_m y] \right\} \right] \quad (12)$$

Thus, the spatial frequency transmitting characteristic with regard to the minute patterns 15 becomes the product of the Fourier conversion $F[\exp(-2y^2/w_0^2)]$ of the Gaussian distribution and $(1-2K_1\cos wx_0)$, wherein $F[\exp(-2y^2/wx_0^2)]$ represents the spatial frequency transmitting characteristic in a case of a single beam. Therefore, by suitably selecting the attenuating coefficient $K_1$ of each of the attenuators 19 and 20 and the distance $x_0$ between the light beam spots, the spatial frequency transmitting characteristic can be improved.

Figure 7:
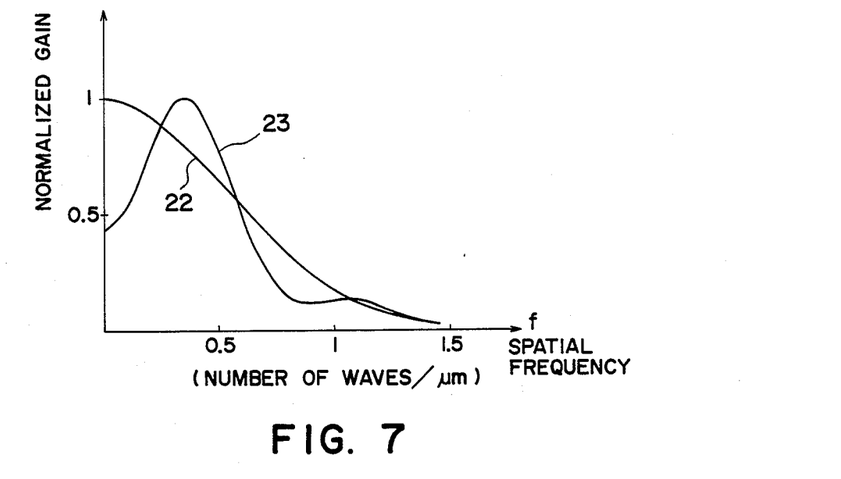
FIG. 7 is a graph showing the improvements in the spatial frequency transmitting characteristic in accordance with the optical information reproducing method of the present invention.

FIG. 7 illustrates an example of the improved spatial frequency transmitting characteristic. In this figure, reference numeral 22 denotes the characteristic, in accordance with the conventional single beam optical information reproducing method, where normalization or regularization is performed on the basis of the gain at a spatial frequency 0 for $F[\exp(-2y^2/w_0^2)]$ in a case of the beam spot diameter $w_0 = 0.6$ μm. Reference numeral 23 denotes the characteristic, according to the above-described embodiment, wherein normalization is performed at the peak gain to $(1-2K_1\cos x_0) \cdot F[\exp(-2y^2/w_0^2)]$ in a case of the distance between the beam spots $x_0 = 1.2$ μm and the attenuating coefficient $K_1 = 0.5$. In the drawing, the abscissa f shows the spatial frequency and there is a relation $w = 2\pi f$.

In this manner, filtering with the spatial frequency is performed whereby equalization of the MTF independent from the tracing speed of the minute patterns is ensured.

The present invention is not limited to the above-described arrangement. That is, the plural beam spots may be formed simply by plural light sources. Further, the number of the beam spots is not limited to three, and the spatial frequency transmitting characteristic can be equalized by the combination of a given number of beam spots with the same number of photoelectric conversion elements.

Figure 8:
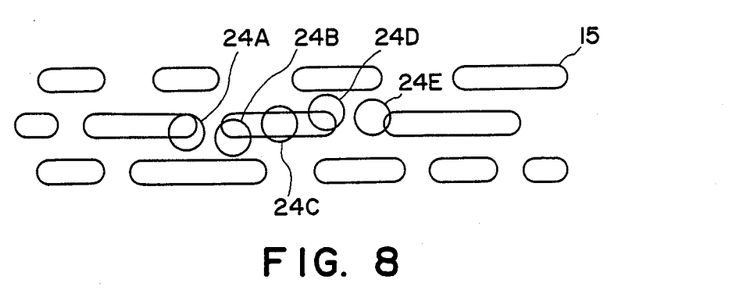
FIG. 8 is a plan view showing another form of arrangement of the beam spots on the information carrying member in accordance with the present invention.

Moreover, the array of the plural beam spots is not limitedly arranged in the direction of tracing of the minute patterns. That is, as is shown in FIG. 8, it is possible to arrange the plural beam spots in any form of array provided that at least a part of each beam spot traces the minute pattern. In FIG. 8, numerals 24A–24E denote the beam spots, respectively.

Further, the present invention is applicable not only to such a system in which the light is reflected by the information carrying member but also to such a system wherein the light is optically modulated by the minute patterns upon transmission through the information carrying member.

Also, the information carrying member may be of any form such as a tape, drum, card or the like.

Furthermore, the attenuator for effecting the operation may of course be replaced by an amplifier, if necessary.

According to the present invention, a desired spatial frequency transmitting characteristic can be set in relation to the optical information reproduction. However, when it is set while considering the spatial frequency transmitting characteristic upon information recording (e.g., the difference in the recording duty ratio according to the frequency of the recording signal), consistent equalization throughout the recording and reproducing systems is permitted.

What is claimed is:

1. An optical information reproducing method comprising the steps of:
   providing a plurality of light beams;
   irradiating an information carrying member having an information pattern recorded thereon with the plural light beams which are spaced from each other at least in the direction of tracing of the information pattern, said plural light beams including at least one light beam impinging on about a central portion of the information pattern;

simultaneously and independently photoelectrically converting the plural light beams modulated by the information pattern into respective output signals by a plurality of photoelectric converters arranged along a direction corresponding to said direction of tracing of the information pattern; and obtaining a reproduction output signal $V_R$ corresponding to the output signals of said plural light beams modulated by the information pattern, wherein a frequency-amplitude characteristic of said output signal $V_R$ is improved relative to $V_1$, by effecting an operation of $V_R = KV_1 + K'V_2 + \ldots + K^{(n-1)}V_{n'}$ where $V_1$ is the output signal corresponding to the light beam impinging on about the central portion of the information pattern, $V_2, \ldots, V_n$ are the ouput signals corresponding to the other light beams, at least two of K, K', ..., $K^{(n-1)}$ are non-zero constants having a finite value, and n is a integer greater than or equal to 2.

2. An optical information reproducing apparatus comprising:

means for providing a plurality of light beams;

means for irradiating an information carrying member having an information pattern recorded thereon with the plural light beams which are spaced from each other at least in the direction of tracing of the information pattern, said plural light beams including at least one light beam impinging on about a central portion of the information pattern;

means for simultaneously and independently photoelectrically converting the plural light beams modulated by the information pattern into respective output signals, said photoelectrical means including a plurality of photoelectric converters arranged along a direction corresponding to said direction of tracing of the information pattern; and operation means for effecting the following operation to obtain a reproduction output signal $V_R$ corresponding to the output signals of the plural light beams modulated by the information pattern, the frequency-amplitude characteristic of the output signal $V_R$ is improved relative to $V_1$:

$$V_R = KV_1 + K'V_2 + \ldots + K(n-1)V_n$$

where $V_1$ is the output signal corresponding to the light beam impinging on about the central position of the pattern, $V_2, \ldots, V_n$ are the output signals corresponding to the other light beams, at least two of K, K', ..., $K^{(n-1)}$ are non-zero constants having a finite value, and n is an integer greater than or equal to 2.

3. An apparatus according to claim 2, wherein said irradiating means includes a light source and means for dividing the light beams emerging from said light source into plural light beams.

4. An apparatus according to claim 2, wherein said photoelectric converting means includes photodetectors of the same number as the plural light beams.

5. An apparatus according to claim 4, wherein said operation means includes at least two of attenuators and amplifiers respectively connected with said photodetectors, and means for effecting at least one of addition and subtraction of outputs effected by said at least two of the attenuators and the amplifiers.

6. An apparatus according to claim 5, wherein said operation means further includes a current-to-voltage convertor interposed between said photodetectors and said at least two of the attenuators and the amplifiers.

7. An apparatus according to claim 2, wherein said irradiating means irradiates the information carrying number with three light beams.

* * * * *

UNITED STATES PATENT AND TRADEMARK OFFICE
CERTIFICATE OF CORRECTION

PATENT NO. : 4,831,613

DATED : May 16, 1989

INVENTOR(S) : Shigeto Kanda

Page 1 of 3

It is certified that error appears in the above-identified patent and that said Letters Patent is hereby corrected as shown below: On the title page:

IN THE REFERENCES CITED U.S. PATENT DOCUMENTS:

At [56] "Takeoka" should read --Tateoka--.

IN THE DRAWINGS:

In Fig. 4, "ADD-SUBTRACTOR" should read --ADD SUBTRACTER--.

IN THE SPECIFICATION:

COLUMN 2

Line 11, "frequencyphase" should read --frequency-phase--.

Line 33, "method ⊗②" should read --method ②--.

COLUMN 4

Line 1, "add-subtractor 21," should read --add-subtracter 21,--.

Line 65, "$G_A(y) = \, _{-\infty}^{\infty}$" should read --$G_A(y) = \int_{-\infty}^{\infty}$--.

COLUMN 5

Line 3, "$G_B(y) = \, _{-\infty}^{\infty}$" should read --$G_B(y) = \int_{-\infty}^{\infty}$--.

Line 8, "$G_C(y) = \, _{-\infty}^{\infty}$" should read $G_C(y) = \int_{-\infty}^{\infty}$--.

Line 16, "add-subtractor 21" should read --add-subtracter 21--.

UNITED STATES PATENT AND TRADEMARK OFFICE
CERTIFICATE OF CORRECTION

PATENT NO. : 4,831,613

DATED : May 16, 1989

INVENTOR(S) : Shigeto Kanda

It is certified that error appears in the above-identified patent and that said Letters Patent is hereby corrected as shown below:

Line 26, "F[ ] should read --"F[ ]"--.

Line 63, "F[exp($-2y^2/wo^2$]" should read --F[exp($-2y^2/w_o^2$)]--.

Line 65, "F[exp($-2y^2/wx_o^2$]" should read --F[exp($-2y^2/w_o^2$)]--.

IN THE CLAIMS:

COLUMN 7

Line 17, "ouput signals" should read --output signals--.

Line 20, "a" should read --an--.

COLUMN 8

Line 8, change "is" to --being--; and change "$V_1$:" to --$V_1$ such that--.

UNITED STATES PATENT AND TRADEMARK OFFICE
CERTIFICATE OF CORRECTION

PATENT NO. : 4,831,613

DATED : May 16, 1989

INVENTOR(S) : Shigeto Kanda

It is certified that error appears in the above-identified patent and that said Letters Patent is hereby corrected as shown below:

Line 20, "light beams" should read --light beam--.

Line 37, "number" should read --member--.

Signed and Sealed this

Twenty-fourth Day of April, 1990

Attest:

HARRY F. MANBECK, JR.

*Attesting Officer*  *Commissioner of Patents and Trademarks*